Sept. 13, 1932.   J. R. JAHN ET AL   1,876,947
PIPE PLUG
Filed Aug. 11, 1930
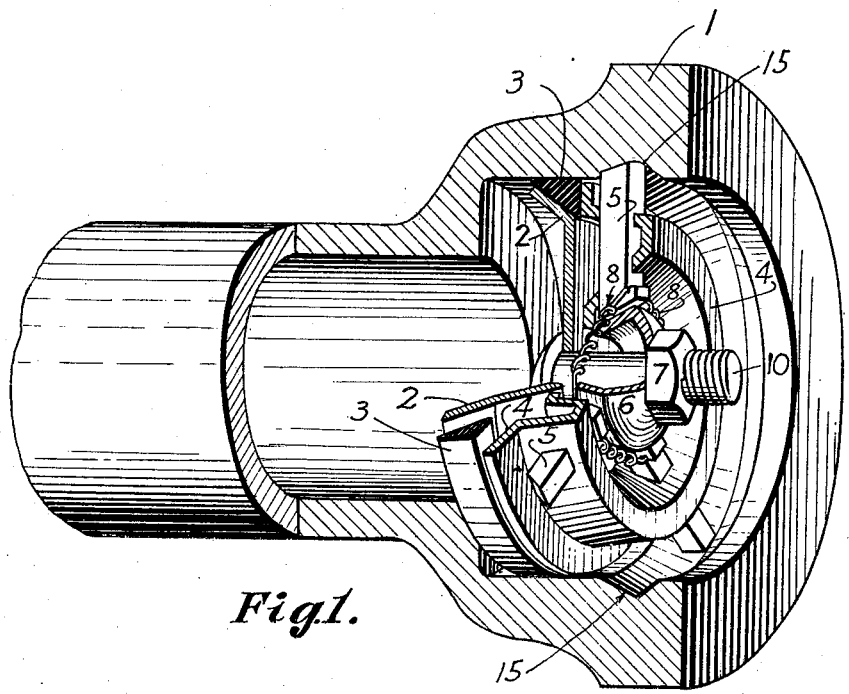
Fig.1.
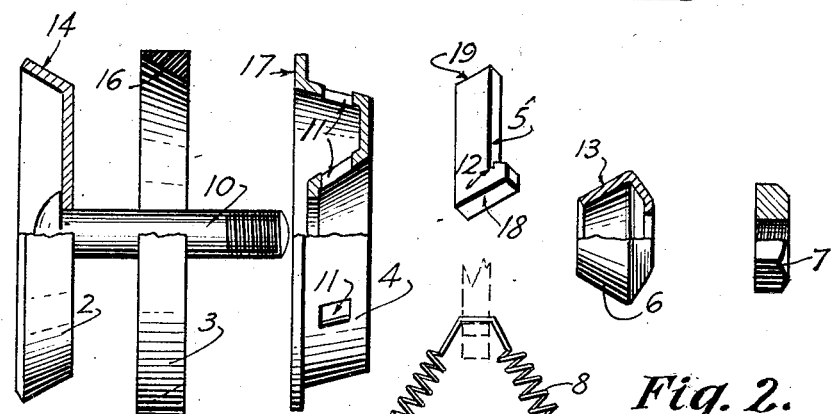
Fig. 2.
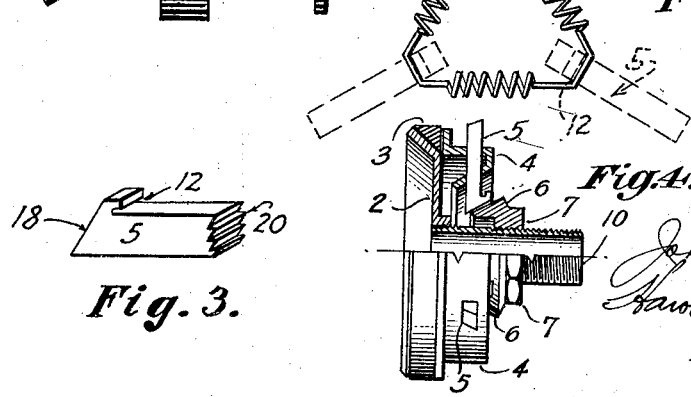
Fig. 3.
Fig. 4.
INVENTORS.

Patented Sept. 13, 1932

1,876,947

UNITED STATES PATENT OFFICE

JOHN R. JAHN, OF BERKELEY, AND HAROLD STEWART DUEY, OF SAN FRANCISCO, CALIFORNIA

PIPE-PLUG

Application filed August 11, 1930. Serial No. 474,460.

This invention relates to means for effecting closure of pipes or tubes against fluid constrained within the same or under pressure and consists of means for pressing resilient material such as rubber, cork, etc., retained upon an impervious diaphragm, against the inner wall of said tube in such manner as to effect a tight closure thereof, and in addition provides a means for forming a stop or abutment behind said resilient material and its impervious housing, against which said housing may rest.

Our invention is particularly adapted to use in making temporary closure of pipes holding water under pressure, wherein the plug, consisting of an impervious diaphragm and an expandable sealing gasket, is inserted into a pipe-socket or "bell", screw means first forcing slidable stops outward into the recess or groove in the wall of said socket and secondly, contracting the sides of an annular peripheral compartment in the plug containing said gasket, thereby compressing the same against the walls of the socket. When desired, it may be removed from the socket by turning back the screw means, relieving the pressure on the gasket and allowing the stops to retract, thereby permitting the removal of the plug, as a unit, from the socket.

To illustrate our invention, we show two forms of construction in the drawing in which Fig. 1 is a view of the assembled device, partially cut-away.

Fig. 2 shows various parts separately and partially cut-away,

Fig. 3 shows a special wedge-form to be used in place of the ones in Figs. 1 and 2, to engage smooth cylindrical tube-walls, and Fig. 4 shows a half-sectional side view of a modified form of our invention in which assemblages of parts other than as shown in Figs. 1 to 3 inclusive, are indicated.

It is apparent that the illustrated forms are only special types of our invention and that modifications of these constructions can be made without departing from the principle thereof.

Referring to the drawing, 1 is the particular type of tube to which this form of our invention is adapted. It is the common bell-end of a cast-iron water pipe or any of its standard fittings. Attention is called to the groove 15, which is standard in this form of fitting. The major parts of this invention are shown by numerals 2 to 8 inclusive, separated views of which are shown in Fig. 2.

Face-plate 2 is an impervious disc having a bevelled peripheral face 14, and a threaded member 10 either immovably or removably mounted in said disc 2.

Member 3 is a gasket of rubber or other resilient material, suitable for compression within a peripheral recess and adapted to the requirements of its particular service. Its face 16 is bevelled to accommodate the face 14, of disc 2, and moves radially on lateral movement of the sides of its recess.

Member 4 is an arched plate or disc having a seating surface 17, adapted to take pressure from the gasket member 3, and plate member 2. It also has radially positioned orifices 11, 11, (Fig. 2) adapted to hold and guide the wedge-stops 5, 5. These wedges, of which a plurality is required, are shaped to conform to the requirements of the service. In Fig. 2 they have forward faces 19, adapted to the form of recess (15 Fig. 1) of the bell, while in Fig. 3, the forward faces 20, have hardened teeth which are adapted to "plow" into the metal of smooth tube walls, being forced in by the wedge action upon face 18 and by pressure from member 4. When actuated by bevelled collar 6 which is freely mounted on screw 10, the face 13, thereof, coming against the bevelled faces 18, of the wedges 5, 5, causes them to move outwardly in the orifices 11, 11 of member 4, until their forward faces 19 or 20, position themselves against the tube wall, substantially as shown in Fig. 1. Groove 12 in wedge 5, provides a means of locating the retracting spring 8, Figs. 1 and 2.

Nut member 7 is a means of engaging the several parts into a compact unit and, with threaded member 10, is the means of forcing gasket member 3 to the walls of the pipe-socket. When assembled as shown in Fig. 1 nut 7 turning on screw 10, pulls face-plate 2, against gasket 3, and arched-plate 4. Wedge-collar 6, registering against face 18, of the wedges 5, 5, forces them outward into the groove 15, of tube 1. Said wedges then form a backing or stop and further turning of nut 7 draws up screw 10 and face-plate 2, and compresses gasket 3 between the seating surface 17 of plate 4, face 14 of plate 2 and the peripheral walls of the tube 1.

In certain forms of our invention we may desire to substitute a short threaded section of pipe of comparatively small diameter as shown in Fig. 4 for the screw member shown at 10 in Figs. 1 and 2. This may be used for admitting or withdrawing fluids into or from the tube. This substitution does not alter the principle of this invention. Said pipe may be united with disc 2 by welding or threading or otherwise. Obviously a running thread, sufficient to carry collar 6, to wedges 5, 5, would be provided on the outside surface of said small pipe. The outer end of said pipe may be closed by a cap or valve or otherwise.

It is obvious that no departure from the spirit of this invention would result in combining collar 6 and nut 7 as shown in Fig. 4. The screw-threads of the latter would then be located on the inside surface of collar 6. In the separate form shown in Figs. 1 and 2 the bevelled face 13, of collar 6, may be pyramidal, with one face for each wedge. In the combined form, however, the bevelled face of collar 6, would, of necessity, be circular.

What we claim as our invention is:

1. A means for closing tubes and the like comprising a compressible gasket, an impervious face member and a seating member between which the gasket is arranged, a plurality of slidable stops within said seating member adapted to engage the inner surface of the tube, a collar member adapted to extend said stops through the seating member and means for forcing said collar member toward said face member.

2. A means for closing tubes and the like comprising a conical-faced end-plate, a rubber sealing gasket, an arched member provided with a seat for said gasket and guide-ways for wedge members, a plurality of extensible wedge members adapted to engage with the internal walls of the tube, a bevelled collar adapted to extend said wedge members in their guide-ways and screw means for advancing said collar toward said end-plate.

3. The device claimed in 2 above wherein the said screw means consists of a threaded member attached to said end-plate and a nut running thereon rearward of said collar.

4. The device claimed in 1 above wherein spring means are provided for retracting said slidable stops, consisting of a peripherally positioned spring member engaging grooves or openings in said slidable stops.

5. A retractable plug for pipes and the like comprising a resilient gasket member, a bevel-faced front member and a seating member between which said gasket member may be compressed, slidable stops housed in said seating member and adapted to be extended outward to engage with the wall of said pipe, means for compressing said gasket and extending said slidable stops and spring means for retracting said stops away from said pipe wall.

6. A pressure stop for use in forms of cast iron pipe bells having peripheral anchor grooves, comprising an impervious face member, and an annular seating member, a resilient gasket peripherally positioned therebetween, a plurality of slidable stops adapted to operate between said seating member and said anchor groove, guides for maintaining said stops in spaced angular relation to each other, spring means for retracting said stops in said guides and means mounted on said face member for extending said stops into said anchor groove and for forcing said face member upon said gasket member.

7. The pressure stop described in claim 6 wherein the said means for extending said stops and for forcing said face member upon said gasket member comprises a threaded pipe nipple anchored in said face member having a running nut thereon and an annular member adapted to be acted upon by said nut to force said annular member toward said face member.

In testimony whereof, we have signed our names to this specification.

JOHN R. JAHN.
HAROLD STEWART DUEY.